RAY WINN
*INVENTOR.*

Oct. 11, 1966 R. WINN 3,278,860
AMPLITUDE-STABILIZED OSCILLATORY SYSTEM
Filed Feb. 5, 1965
3 Sheets-Sheet 2

RAY WINN
INVENTOR.

BY Cadwallader, Kelly &
Dacey
ATTORNEYS

RAY WINN
*INVENTOR.*

BY Cadwallader, Kelly & Dacey

ATTORNEYS

United States Patent Office 3,278,860
Patented Oct. 11, 1966

3,278,860
AMPLITUDE-STABILIZED OSCILLATORY SYSTEM
Ray Winn, Las Vegas, Nev., assignor to Edgerton, Germeshausen & Grier, Inc., Bedford, Mass., a corporation of Massachusetts
Filed Feb. 5, 1965, Ser. No. 430,717
3 Claims. (Cl. 331—109)

The present invention relates generally to oscillatory systems and, more particularly, to an improved amplitude-stabilized oscillatory system wherein the waveform of the oscillatory output signal is stabilized against variations in the characteristics of the active elements of the circuit occasioned by drastic changes in ambient conditions such as temperature and humidity, as well as against changes in the power supply.

The amplitude of oscillations of various oscillatory circuits, in particular of transistorized oscillatory circuits, often varies considerably with changes in environmental conditions to which the components thereof may be subjected. In many applications, particularly in missiles and spacecraft, such changes in amplitude are undesirable and must be eliminated for the system satisfactorily to perform its intended function.

There have been numerous attempts directed at providing amplitude-stabilization in oscillatory systems, with various degrees of success. One form of amplitude stabilization is disclosed in "An Amplitude Stabilized Transistor Oscillator" by E. R. Kretzmer published in the Proceedings of the IRE, February 1954, pages 391–401. Amplitude stabilization was obtained in a push-pull transistor oscillator by comparing the output voltage to a fixed reference voltage and feeding back the difference voltage in order to stabilize the amplitude of oscillation.

It is, therefore, an object of the present invention to provide an amplitude-stabilized oscillatory system in which the waveform of the oscillatory output signal is stabilized against variations in the characteristics of the active elements of the circuit under the most drastic ambient conditions and regardless of variations in the power supply. More particularlly, it is an object of the present invention to provide an improved amplitude-stabilized oscillatory system comprising an oscillator for producing an oscillatory output signal and including a control element adapted to vary the amplitude of the oscillatory output signal; a circuit means coupled to the oscillator output for producing a demodulating signal; a demodulator coupled to the oscillator output and to the output of the circuit means for synchronously demodulating the oscillatory output signal; a direct current reference source coupled to the output of the demodulator and opposing the current output thereof; a means for amplifying the difference in current between the source and the demodulator; and a further circuit means connecting the output of the amplifying means, the oscillatory output signal and the control element to couple the current difference to the control element, reducing thereby the current difference to zero.

Other and further objects of the invention will in part be obvious and will in part appear hereinafter.

The invention accordingly comprises the improved amplitude-stabilized oscillatory system possessing the construction, combination of elements, and arrangement of parts which are exemplified in the following detailed disclosure, and the scope of which will be indicated in the appended claims.

For a fuller understanding of the nature and objects of the invention, reference should be had to the following detailed description, taken in connection with the accompanying drawings wherein.

Figure 3:
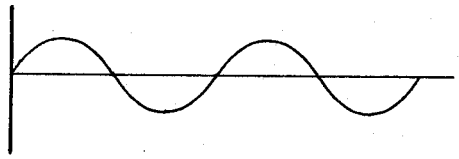
FIG. 3 is a sine waveform representing one form of an oscillatory output signal.
Figure 6:
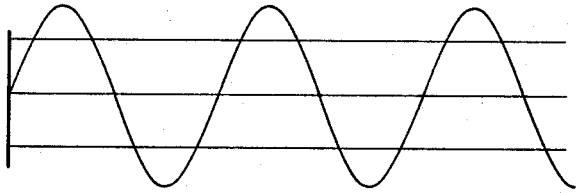
FIG. 6 represents an oscillatory output signal without amplitude stabilization.
Figure 7:
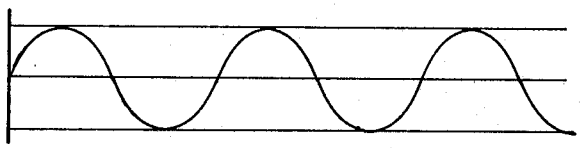
FIG. 7 represents an oscillatory output signal with amplitude stabilization as produced by the system of the invention.

Referring to the drawings, in which like reference characters refer to like parts throughout, the illustrated embodiment of the invention includes an oscillator, which may be any kind of an oscillator such as a sine wave oscillator, a square wave oscillator or a sawtooth wave oscillator, etc. For purposes of simplicity, the oscillator 10 is herein described as a sine wave oscillator, producing an oscillatory output waveform such as shown in FIG. 3. This sine wave oscillation is derived at the oscillator output as represented by lead 12. Without the provision of the system as hereinafter described, there would be variations in amplitude of the sine wave at the output 12 with variations in the characteristics of the active elements of the oscillator 10 occasioned by changes in temperature and humidity, as well as with variations in the power supply. Such undesirable changes in amplitude are depicted in FIG. 6. The oscillatory system of the present invention provides amplitude stabilization as shown in FIG. 7, regardless of variations in environmental conditions, and the invention may be best described and understood with reference to its operation.

Figure 1:
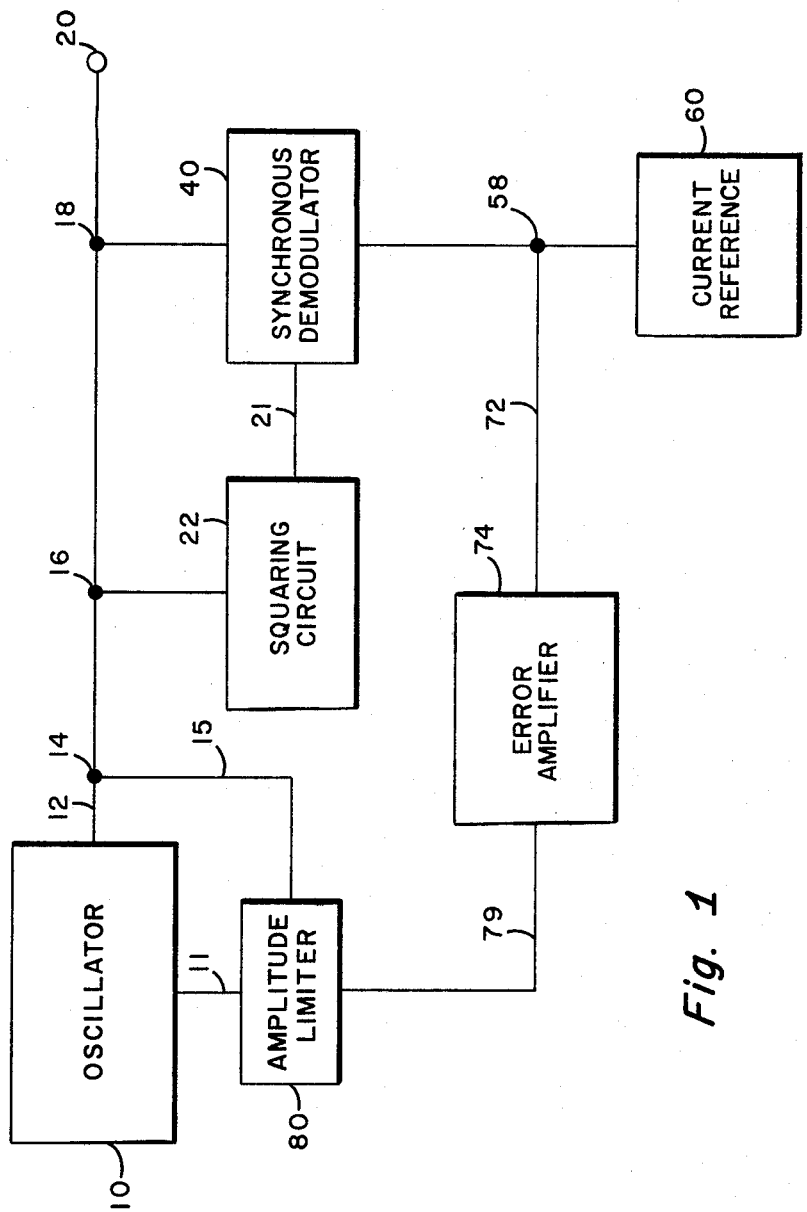
FIG. 1 is a block diagram of an amplitude-stabilized oscillatory system constructed in accordance with and embodying the present invention.
Figure 2:
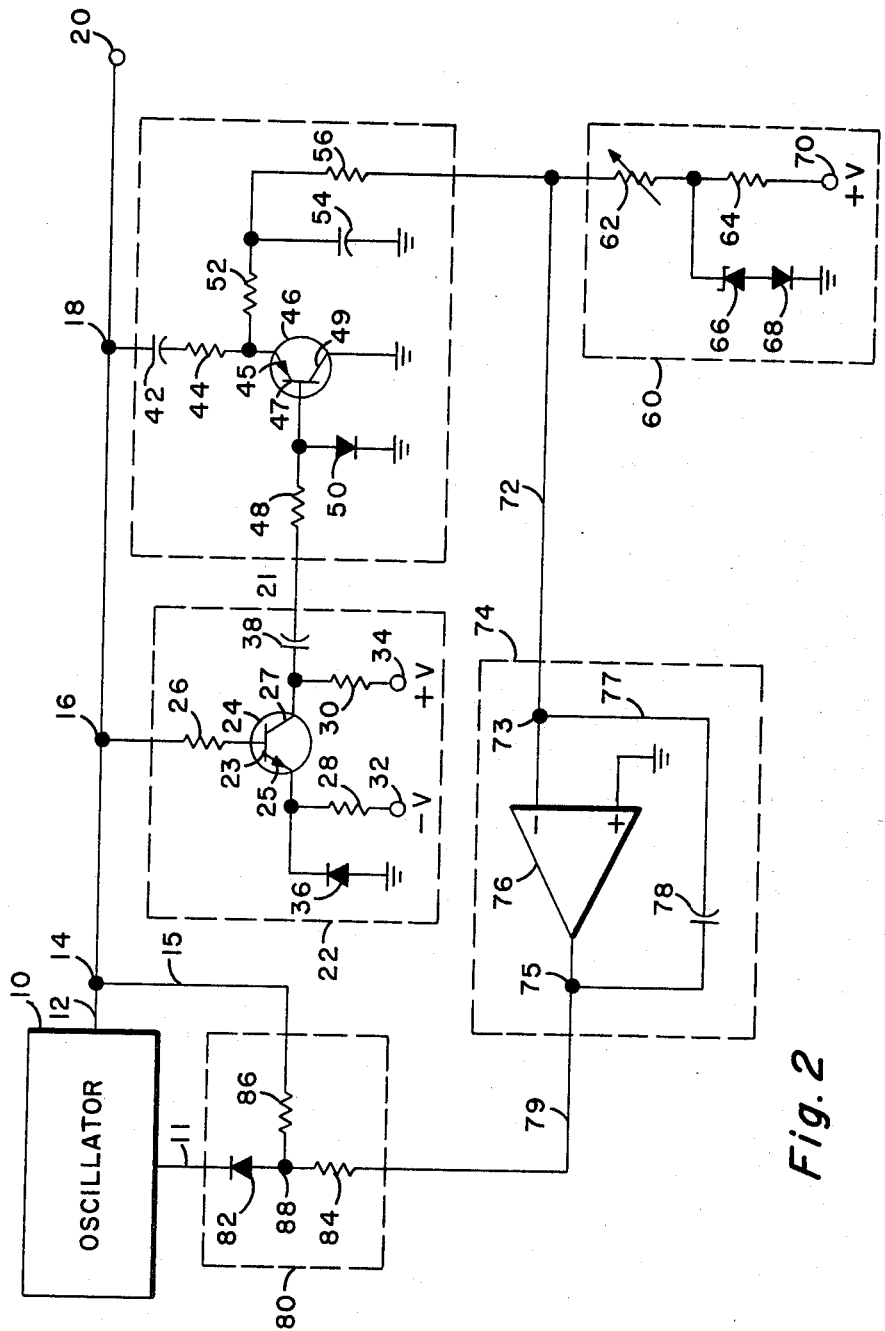
FIG. 2 is a schematic diagram of the oscillatory system shown in FIG. 1.
Figure 4:
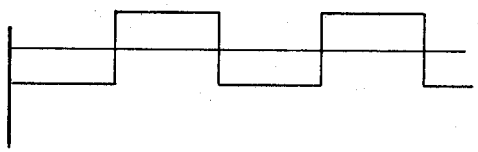
FIG. 4 represents the demodulating signal derived by squaring the oscillator output signal of FIG. 3.
Figure 5:
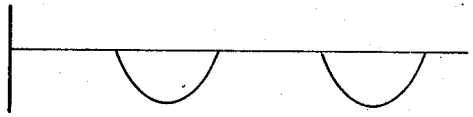
FIG. 5 shows the synchronous demodulation of the oscillator output signal by the demodulator.

As may be noted in FIGS. 1 and 2, a squaring circuit 22 is coupled to the output 12 of the oscillator 10, as at 16. This circuit means 22 is designed for producing a demodulating signal directly from the sine wave output, as shown in FIG. 4. It should be noted that the derived squared demodulating signal is of the same frequency as that of the oscillator output, but is 180 degrees out of phase therewith. This demodulating squared signal is then used to synchronously demodulate the oscillator output by the demodulator 40, which is also coupled to the oscillator output 12, as at 18.

The squaring circuit 22 is herein disclosed as consisting of an NPN transistor 24 having a base electrode 23, an emitter electrode 25 and a collector electrode 27. The base 23 is connected through base resistor 26 to point 16. The emitter electrode 25 is connected through an emitter dropping resistor 28 to a negative direct-current bias voltage at terminal 32, with the resistor 28 being shunted by a diode 36 whose anode is grounded and whose cathode is also connected to the emitter 25. Thus, when the transistor 24 is non-conducting, the negative direct-current bias voltage applied at terminal 32 may be effectively grounded by diode 36. The collector electrode 27 is biased through resistor 30 by a direct-current positive voltage applied at terminal 34. The output of transistor 24, which is a square wave demodulating signal as shown in FIG. 4, is coupled by the coupling capacitor 38 and through lead 21 to the demodulator 40.

Since transistor 24 is an NPN transistor, the positive peak of the oscillatory output waveform taken from point 16 and applied through base resistor 26 to the base 23 thereof, will have the effect of turning transistor 24 on and making it conduct heavily. The corresponding output will be a negative step voltage coupled by the coupling capacitor 38 and lead 21 to the demodulator circuit 40. On the other hand, the negative going excursion of the oscillatory output waveform applied to the base 23 through resistor 26 will have the effect of cutting off conduction through the transistor 24. The corresponding output will be a positive going step voltage coupled by coupling capacitor 38 through lead 21 to the demodulator circuit 40.

The function of the demodulator circuit 40 is to demodulate the oscillatory output waveform taken at point 18 synchronously with the demodulating squared signal taken from the output lead 21 of the squaring circuit 22. The demodulator circuit comprises a transistor 46 which is a PNP transistor having an emitter electrode 45, a base electrode 47 and a collector electrode 49. A coupling capacitor 42 in series with resistor 44 connects the output of the oscillator to the emitter electrode 45. The collector electrode 49 is directly connected to ground as shown, while the base electrode 47 is connected through resistor 48 to the output lead 21 of the squaring circuit. The base electrode 47 is also connected to ground through diode 50 whose anode is connected to the junction of the resistor 48 and the base 47 and whose cathode is grounded.

The output of transistor 46 is taken from the emitter in an emitter-follower fashion across resistor 52 to which is connected one side of a storage capacitor 54, whose other side is grounded. Resistor 52 and capacitor 54 form in effect a resistance-capacitance filter network. Storage capacitor 54 is provided to accumulate a charge thereon which will be proportional to the amplitude of the oscillatory output waveform. The rectified and filtered direct-current charge accumulated on the capacitor 54 is then carried through resistor 56 to a current summation junction 58.

The synchronous demodulator circuit 40 operates as follows. A negative going step voltage of the squared demodulating signal taken from the output lead 21 of the squaring circuit 22 and applied through base resistor 48 to the base electrode 47 of the transistor 46 will render the transistor 46 conductive. Since this negative going step voltage of the demodulating signal is applied simultaneously with the positive excursion of the oscillatory output waveform as taken at point 18 and coupled through capacitor 42 and series resistor 44 to the emitter electrode 45, such positive pulses of the oscillatory output waveform are effectively shorted to ground by the conducting transistor 46. The negative excursions of the oscillatory output waveform, on the other hand, are not and cannot be shorted to ground through transistor 46, since they coincide with the positive step voltages of the demodulating squared signal being coupled to the base electrode 47 through lead 21 and base resistor 48, effectively cutting off conduction through transistor 46. Part of these positive step voltages is shunted to ground through the diode 50. Since transistor 46 is non-conducting during the negative excursions of the oscillatory output wave, such negative excursions are passed through the resistor 52 and are accumulated on the storage capacitor 54, developing thereby a filtered charge on the capacitor 54 whose value will be proportional to the amplitude of the oscillator output. This rectified direct-current is then passed through resistor 56 to the current summation junction 58. It should be noted that this rectified current passing through resistor 56 is a negative going current.

A positive direct-current reference source 60 is also connected to the current summation junction 58, and is designed to oppose the negative going current output reaching the junction 58 from the demodulator circuit 40. This current reference source 60 comprises a variable resistor 62 and a series resistor 64 whose terminal 70 is connected to a positive direct-current voltage. A temperature compensated Zener diode 66 is connected by its cathode to the junction intermediate of resistors 62 and 64. The anode of the Zener diode 66 is directly coupled to the anode of temperature compensating diode 68, whose cathode is grounded. In situations when the amplitude of the oscillatory output waveform at the output lead 12 is at the desired predetermined value and thus requiring no adjustment, the negative going current reaching the current summation junction 58 from the demodulator 40 will be exactly equal to but effectively opposed by the positive going current reaching the junction 58 from the current reference source 60. Thus, no current will be flowing through lead 72 to the error amplifier 74. On the other hand, in situations when the amplitude of the oscillatory output waveform at the output lead 12 deviates from the desired predetermined value, the negative going current reaching the current summation junction 58 from the demodulator circuit 40 will not be equal to the positive going current reaching the junction 58 from the current reference source 60. The current difference, that is the error current thus generated, will flow in lead 72 into the error amplifier 74.

Error amplifier 74 consists basically of an operational amplifier 76 having an input 73 and an output 75. A capacitor 78 connected between the input 73 and the output 75 in a voltage feedback loop 77 is designed to keep the output of the amplifier 76 from oscillating. A small amount of current difference admitted through lead 72 to the input of the amplifier 76, due to the inherent characteristics of the operational amplifier, will produce a relatively large voltage output at the output 75. This large error voltage results in a negative current flowing through lead 11, which connects the input of the basic oscillator 10 with the amplitude limiting circuit 80, and hence through lead 79 to the output 75 of the error amplifier. This negative current flows through back-biased diode 82, which represents the control element for the oscillator 10, and resistor 84. The amplitude limiter circuit 80 is also connected to the oscillator's output 12, as at 14, through lead 15 and resistor 86, whose other end is connected between the anode of diode 82 and resistor 84, as at 88. On the positive going swing of the oscillatory output waveform appearing at the output 12, a positive going current is forced through resistor 86 to the junction 88. When this positive going current reaching the junction 88 exceeds the negative current through the resistor 84, the diode 82, representing the amplitude control element in the oscillator 10, becomes forward biased. This action results in reducing the open loop gain of the oscillator 10 at the peak of each oscillation cycle and thus limits the amplitude of the oscillatory output waveform to the desired value. Thus, at the terminal output 20 of the amplitude-stabilized oscillatory system of the invention, an oscillatory output waveform will appear that will be stabilized against variations in the characteristics of the active elements of the circuit under widely varying ambient conditions and which will not be adversely affected by changes in the power supply.

The amplitude of the oscillatory output waveform may be conveniently adjusted to any selected and predetermined value by simply varying the effective resistance of the variable resistor 62 in the current reference source 60.

It should be pointed out that the temperature coefficient of diode 82, i.e., the control element, has no effect on the control of stability of oscillations.

A preferred embodiment of an amplitude-stabilized oscillatory system as shown in FIGS. 1 and 2 has performed most satisfactorily with the following components:

| Numeral | Item | Rating |
|---|---|---|
| 26, 30 | Resistors | 2,700 ohms. |
| 28 | do | 22,000 ohms. |
| 38, 42 | Capacitor | 1.5 mfd., D.C. Bias Voltages at Terminals 32 and 34±15 v. D.C. |
| 44 | Resistor | 4,300 ohms. |
| 52, 56 | do | 15,000 ohms. |
| 54 | Capacitor | 50 mfd. |
| 62 | Variable Resistor | To be variable between 20,000 and 15,000 ohms; Preferred Value 68,100 ohms. |
| 64 | Resistor | 1,200 ohms. D.C. Bias Voltage at Terminal 70+15 v. D.C. |
| 78 | Capacitor | 1 mfd. |
| 84, 86 | Resistors | 50,000 ohms. |

The particular transistors may be reversed in characteristics provided care is taken also to reverse the direct-current bias voltages.

The temperature coefficients of the resistors 84 and 86 have no bearing on the oscillatory output waveform. Care should be exercised, however, that resistors 44, 52, 56 and 64 should have the same temperature coefficients.

The described preferred embodiment of the oscillatory system has been effectively used as a master reference oscillator in carrier data systems.

The present invention thus provides an amplitude-stabilized oscillatory system wherein the waveform of the oscillatory output signal is stabilized against variations in the characteristics of the active elements of the circuit under widely varying ambient conditions, as well as against changes in the power supply.

Since certain changes may be made in the above described oscillatory system without departing from the scope of the invention herein involved, it is intended that all matter contained in the above description or shown in the accompanying drawings shall be interpreted in an illustrative and not in a limiting sense.

What is claimed is:

1. An oscillator for generating oscillations at its output and including a control element for limiting the amplitude of said oscillations; circuit means coupled to said output for producing a demodulating signal; a demodulator coupled to said output and to the output of said circuit means for synchronously demodulating said oscillations; a current reference source coupled to the output of said demodulator and opposing the current output thereof; means for amplifying the difference in current between said source and said demodulator; and circuit means coupled to said amplifying means, the output of said oscillator and said control element to couple said current difference to said control element, thereby to reduce said current difference to zero.

2. An amplitude-stabilized oscillatory system comprising an oscillator for producing oscillations at its output and including a control element adapted to vary the amplitude of said oscillations; circuit means coupled to said output for squaring said oscillations; a demodulator coupled to said output and to the output of said squaring circuit for synchronously demodulating said oscillations; a current reference source coupled to the output of said demodulator for generating a current to oppose the output current of said demodulator; means for amplifying the current difference between said source and said demodulator; and circuit means coupling the output of said amplifying means and the output of said oscillator to said control element, thereby to reduce said current difference to zero.

3. An amplitude-stabilized oscillatory system comprising: a source of oscillations including a control element for adjusting the amplitude of the output oscillations; circuit means coupled to the output of said source for squaring said oscillations; rectifying means coupled to the output of said source and to the output of said squaring circuit means for synchronously producing a direct current proportional to the amplitude of said output oscillations; a reference direct current source coupled to the output of said rectifying means to oppose the current output thereof and to provide an error current when the amplitude of said oscillations deviates from a predetermined value; means for amplifying said error current to produce a direct current error voltage; and circuit means coupled to said amplifying means, the output of said oscillator and said control element and adapted to apply the difference between the amplitude of said oscillations and said direct current error voltage to said control element to reduce said error current to zero.

No references cited.

ROY LAKE, *Primary Examiner.*

S. H. GRIMM, *Assistant Examiner.*